United States Patent
Becker et al.

(10) Patent No.: US 10,841,130 B2
(45) Date of Patent: Nov. 17, 2020

(54) IOT COMMUNICATION MODULE FOR A BUILDING TECHNOLOGY DEVICE, BUS DEVICE, A BUILDING TECHNOLOGY DEVICE FOR IOT-NETWORKS, BUILDING TECHNOLOGY COMMUNICATION SYSTEM AND BUILDING TECHNOLOGY MANAGEMENT SYSTEM

(71) Applicant: TRIDONIC GMBH & CO KG, Dornbirn (AT)

(72) Inventors: Markus Becker, Lindau (DE); Giulio Borsoi, Dornbirn (AT); Abhinav Somaraju, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 144 days.

(21) Appl. No.: 16/079,714

(22) PCT Filed: Jan. 31, 2017

(86) PCT No.: PCT/EP2017/052045
§ 371 (c)(1),
(2) Date: Aug. 24, 2018

(87) PCT Pub. No.: WO2017/153094
PCT Pub. Date: Sep. 14, 2017

(65) Prior Publication Data
US 2019/0074994 A1    Mar. 7, 2019

(30) Foreign Application Priority Data

Mar. 11, 2016  (EP) .................................. 16159921

(51) Int. Cl.
*G06F 15/16* (2006.01)
*H04L 12/46* (2006.01)
(Continued)

(52) U.S. Cl.
CPC ...... *H04L 12/4625* (2013.01); *H04L 12/4612* (2013.01); *H04L 69/164* (2013.01);
(Continued)

(58) Field of Classification Search
CPC . H04L 29/08072; H04L 29/06; H04L 5/0064; G06F 3/167
(Continued)

(56) References Cited

U.S. PATENT DOCUMENTS 7,483,964 B1    1/2009  Jackson et al.
10,375,079 B2 *  8/2019  Infante-Lopez ........ H04W 4/80
(Continued)

OTHER PUBLICATIONS

European Search Report in priority European application 16159921.2 dated Jun. 24, 2016.
(Continued)

*Primary Examiner* — Khanh Q Dinh
(74) *Attorney, Agent, or Firm* — Andrus Intellectual Property Law (57) ABSTRACT

A communication module for a building technology device, especially a luminaire, is provided, wherein the communication module is configured to be connectable to an IoT-network and a communication bus, and being configured for a bi-directional communication on the IoT-network and the communication bus, wherein the communication module is configured to convert communication data between the communication bus and the IoT-network.

17 Claims, 7 Drawing Sheets a) | S | uniC dest. address | uniC source address | b) Exemplary format of uniC packages of on the communication bus
| uniC Start |
| uniC destination address +W |
| uniC source address (source) |
| Next Protocol |
| Request Length |
| TX Data (LWM2M/CoAP) |
| CRC-32 |

(51) Int. Cl.
  *H04L 29/06* (2006.01)
  *H04W 92/06* (2009.01)
  *H04W 4/70* (2018.01)
  *H04W 4/80* (2018.01)
(52) U.S. Cl.
  CPC .............. *H04W 92/06* (2013.01); *H04W 4/70* (2018.02); *H04W 4/80* (2018.02)
(58) Field of Classification Search
  USPC .................. 709/220, 224, 226, 228, 232
  See application file for complete search history.

(56) References Cited

U.S. PATENT DOCUMENTS

| | | | |
|---|---|---|---|
| 10,673,557 B2* | 6/2020 | Bagheri | ............... H04L 1/0068 |
| 2013/0261774 A1 | 10/2013 | Lu et al. | |
| 2016/0149767 A1* | 5/2016 | Britt | ................... G06Q 30/0641 |
| | | | 715/727 |
| 2018/0007055 A1* | 1/2018 | Infante-Lopez | ........ H04W 4/80 |
| 2018/0240322 A1* | 8/2018 | Potucek | ................... E04H 4/14 |
| 2019/0105226 A1* | 4/2019 | Potucek | ............... A61H 33/005 |
| 2019/0174208 A1* | 6/2019 | Speicher | ............... H04B 1/385 |
| 2019/0297086 A1* | 9/2019 | Infante-Lopez | ...... H04L 63/102 |
| 2019/0335551 A1* | 10/2019 | Williams | ............. H05B 47/105 |
| 2019/0343253 A1* | 11/2019 | Gharabegian | ........... G06F 3/167 |

OTHER PUBLICATIONS

International Search Report and Written Opinion in parent PCT application PCT/EP2017/1052045 dated Mar. 6, 2017.
Avontns, et al., Towards Smart Street LED Lighting Systems and Preliminary Energy Saving Results, 2014 55th International Scientific Conference on Power and Electrical Engineering of Riga Technical University (RTUCON), Oct. 14, 2014, pp. 130-135.
Wu, et al., A Design of Embedded DALI Controller, Industrial Informatics, 2006 IEEE International Conference, Aug. 1, 2006, pp. 1237-1240.
Kastner, et al., Building automation systems integration into he Internet of Things the IoT6 approach, its realization and validation, Proceedings of the 2014 IEEE Emerging Technology and Factory Automation (ETFA), Sep. 16, 2014, pp. 1-9.

* cited by examiner

IOT COMMUNICATION MODULE FOR A BUILDING TECHNOLOGY DEVICE, BUS DEVICE, A BUILDING TECHNOLOGY DEVICE FOR IOT-NETWORKS, BUILDING TECHNOLOGY COMMUNICATION SYSTEM AND BUILDING TECHNOLOGY MANAGEMENT SYSTEM

CROSS REFERENCE TO RELATED APPLICATIONS

The present application is the U.S. national stage application of International Application PCT/EP2017/052045 filed Jan. 31, 2017, which international application was published on Sep. 14, 2017 as International Publication WO 2017/153094 A1. The International Application claims priority to European Patent Application 16159921.2 filed Mar. 11, 2016

FIELD OF THE INVENTION

The invention relates to a communication module for a building technology device, a bus device connectable to the communication module, a building technology device for IoT-networks, a building technology communication system comprising a building technology device and IoT-network devices and a building technology management system of the building technology communication system.

SUMMARY OF THE INVENTION

The building technology device especially is a luminaire, which is connectable to an IoT-network and comprises the communication module as well as at least one bus device. The communication module on the one hand connects the building technology device to the IoT-network, but on the other hand is connected to a communication bus to which the at least one bus device is detachably connected. This means, that the bus device can be exchanged by another bus device, but also that additional and different bus devices can be connected to the communication module via the communication bus.

Therefore, in the building technology communication system, at least one building technology device is connected with at least one other IoT-network device, which also can be a building technology device, especially also comprising a communication module as described herein. The invention especially aims at providing intelligent building technology devices, which can be used in modern IoT-networks. In addition, a building technology management system (BTMS), for example a light management system (LMS) can be part of the building technology communication system. At least one building technology device is connectable to an "internet-of-things" (IoT) network which in principle is a communication network, which can use known communication standards (especially IPv4 and/or IPv6 based standards).

The invention therefore provides a communication module, a bus device, a building technology device, a building communication system and a building technology management system according to the independent claims. Further aspects of the invention are subject to the dependent claims.

In a first aspect, a communication module for a building technology device, especially a luminaire, is provided, wherein the communication module is configured to be connectable to an IoT-network and a communication bus, and being configured for a bi-directional communication on the IoT-network and the communication bus, wherein the communication module is configured to convert communication data between the communication bus and the IoT-network.

The communication module can be a bus master. The communication bus can be an Inter-integrated circuit. The communication module can be configured with a fixed address on the communication bus. The communication module can perform a transparent conversion and in particular converts a data package format used on the communication bus to a data package format used on the IoT-network, and/or vice versa.

The communication module can receive a request for assignment of a communication bus address on the communication bus, the request for assignment of a communication bus address preferably including identifier data, preferably a communication bus source address, a hardware address, and/or a unique identifier of at least one bus device. The communication module can assign an address and to respond to the request for assignment of a communication bus address by sending the assigned address with communication bus address data, including the identifier data, on the communication bus. The communication module can store the identifier data in association with the assigned address. The communication module is configured to read a stored assigned address when the communication module is powered up.

The communication module can receive IoT-request data from the IoT-network, store IoT-request data information, preferably IoT-network source data, and send a request on the communication bus according to the IoT-request data. The communication module may store the IoT-request data information, preferably in a look-up table. The communication module can receive an answer on the communication bus and send IoT-answer data on the IoT-network using the stored IoT-request data information. The communication module can receive functionality information including information about at least one functionality of the at least one bus device on the communication bus and is configured to forward the functionality information on the IoT-network, preferably to a predetermined IoT-network address. The communication module preferably is configured to operate as a transparent gateway between the IoT-network and the communication bus. Data received from on the communication bus can comprise a source address, preferably a communication bus source address.

The communication module can be detachably connected to the at least one bus device by at least a two wire connection for bus communication, preferably by a four wire connection, wherein two of the four wires can be a power supply for the at least one bus device and/or the communication module. The communication module can communicate and assign addresses to changed and/or added bus devices on the communication bus and to register removed bus devices.

In another aspect a bus device for a communication bus is provided, wherein the bus device is detachably connected by the communication bus to a communication module. The bus device is configured to selectively operate as a bus master, and wherein the bus device is configured to initiate a communication with the communication module, and is configured to send a request for assignment of a communication bus address to the communication module via the communication bus, including identifier data, preferably a communication bus source address, a hardware address, and/or a unique identifier of the bus device.

The bus device can receive an assigned address with communication bus address data from the communication module and can store the assigned address. The bus device can read the stored assigned address when the bus device is powered up. The bus device can receive an IoT-request, evaluate the IoT-request and send an IoT-answer to the communication module. The bus device may perform an action associated with the IoT-request. For evaluation of data, the communication module and/or the bus device can be equipped with a processing unit or a processing circuit, e.g. an IC, ASIC and/or a microprocessor (μC).

The bus device can be an electronic and/or mechanical sensor and/or an electronic and/or mechanical actuator, preferably connected to a lighting means. The bus device can be a gateway to other bus infrastructures such as a DALI, DSI or the DMX, and/or LuxMate bus, and/or can comprise a power supply. The bus device can communicate indirectly with another bus device on the communication bus via the communication module. The bus device can send functionality information including information about at least one functionality of the bus device to the communication module. The bus device can initiate a communication on the communication bus, preferably with at least one communication module on the communication bus.

In yet another aspect, a building technology device, preferably a luminaire, is provided, comprising a communication module, configured to connect the building technology device to an IoT-network, and a communication bus connected to the communication module, configured to detachably connect the communication module to at least one bus device of the building technology device, wherein the communication module is configured for a bi-directional communication with the at least one bus device and the IoT-network.

The communication module can receive IoT-request data from the IoT-network, store IoT-request data information, and send an IoT-request to the at least one bus device according to the IoT-request data, wherein the IoT-request data information preferably is a source address in the IoT-network, and preferably is stored in a look-up table in the storage unit. The at least one bus device can receive the IoT-request, evaluate the IoT-request and send an IoT-answer to the communication module. The communication module can receive the IoT-answer from the at least one bus device and send IoT-answer data on the IoT-network using the stored IoT-request data information, and wherein the at least one bus device preferably performs an action according to the IoT-request.

The at least one bus device can initiate a communication with the communication module. The communication module and/or the at least one bus device may comprise a storage unit, which can store the address assigned to the at least one bus device. The communication module and/or the at least one bus device can read the stored assigned address when the communication module and/or the at least one bus device is powered up. The building technology device can comprise at least a second bus device, wherein the at least one bus device can communicate indirectly with the second bus device on the communication bus via the communication module. The second bus device may be a power supply means, e.g. a battery.

In still another aspect a building technology communication system, is provided, comprising at least one building technology device, preferably a luminaire, with a communication module and at least one bus device, wherein the communication module is connected to an IoT-network, and at least one IoT-network device connected to the IoT-network, wherein the communication module is configured to receive IoT-request data from the at least one IoT-network device on the IoT-network, to store IoT-request data information, and to send an IoT-request to the at least one bus device, wherein the at least one bus device is configured to receive the IoT-request and to send an IoT-answer to the communication module, and wherein the communication module is configured to receive the IoT-answer from the at least one bus device and to send IoT-answer data on the at least one IoT-network device on the IoT-network using the stored IoT-request data information.

The IoT-request data information preferably is an address of the at least one IoT-network device. The building technology communication system may comprise a building technology management system connected to the IoT-network, wherein the building technology management system can store functionality information representing functionalities provided by the at least one building technology device, in particular by the at least one bus device of the building technology device. The at least one bus device can send the functionality information about at least one functionality of the at least one bus device to the communication module. The communication module can send the functionality information about at least one functionality of the at least one bus device to the building technology management system. The building technology management system can receive a functionality request from the at least one IoT-network device and/or can send the stored functionality information to the IoT-network device. The building technology management system can forward the functionality request to the at least one building technology device providing the functionality according to the stored functionality information, wherein the building technology management system in particular may forward communication between the at least one IoT-network device and the at least one building technology device providing the functionality. The building technology management system can send stored functionality information to the at least one IoT-network device indicating at least the at least one building technology device providing the functionality. The IoT-network device may engage in communication with the at least one building technology device based on the functionality information received by the at least one IoT-network device.

The building technology communication system can comprise at least a second building technology device comprising a communication module, wherein the at least one communication module of the at least one building technology device can directly communicate with the communication module of the at least one second building technology device, preferably via the IoT-network. The at least one building technology device and the at least one second building technology device can be configured in a control group and in different subnets.

The at least one communication module and/or the building technology management system can store a list of IoT-network devices allowed to communicate with the at least one building technology device, especially during a commissioning phase of the building technology communication system. The at least one IoT-network device can be a building technology device, and/or a gateway to other bus infrastructures such as a DALI, DSI or the DMX, and/or LuxMate bus.

In a further aspect, a building technology management system is provided, configured to be connected to an IoT-network, wherein the Building technology management system is configured to store functionality information representing functionalities provided by at least one building technology device according to claim 9, in particular by the at least one bus device of the building technology device.

The at least one IoT-network device can be a cloud service or cloud server, a local server, a personal computer, a smartphone or a tablet PC. IoT-network devices may be printers, POE-cameras, POE-phones, POE-routers.

BRIEF DESCRIPTION OF THE FIGURES

The invention is now also described with reference to the figures. In particular.

DETAILED DESCRIPTION

The communication module can act as a gateway, conversion or translation barrier connecting the IoT-network side of the building technology device or the communication module and the communication bus infrastructure, which preferably is internal to the building technology device. The communication bus is based on the I²C standard protocol. This protocol is extended to the so-called "uniC" protocol as described herein.

Figure 1:
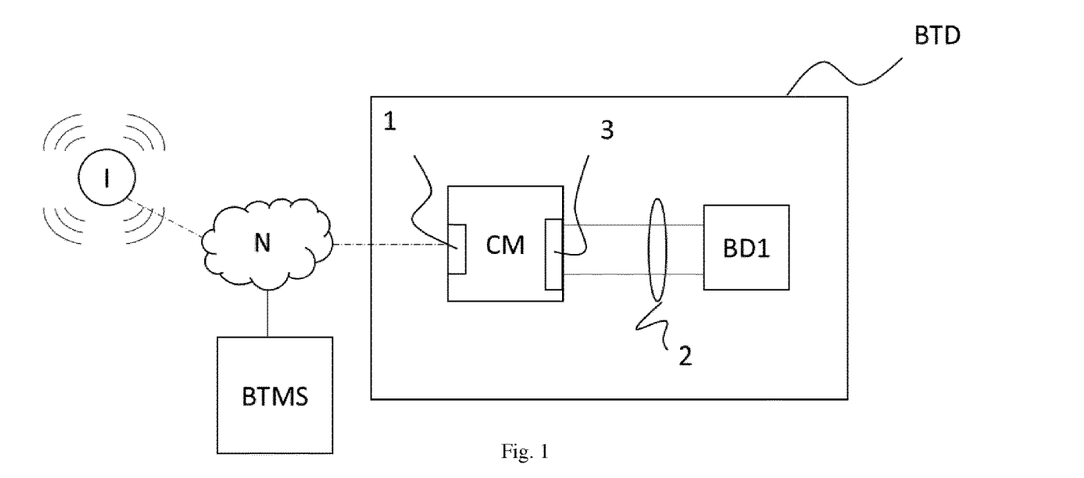
FIG. 1 shows a general overview of the invention and the corresponding devices.

FIG. 1 illustrates a communication module CM for a building technology device. The communication module CM is shown as being connected to an IoT-network N and a communication bus 2. The communication module CM comprises an IoT-network interface 1 and a communication bus interface 3. The communication module CM can especially receive and send data on the IoT-network interface 1 as well as on the communication bus interface 3 to facilitate a bi-directional, preferably synchronous and/or asynchronous communication via the IoT-network interface on the IoT-network N and/or on the communication bus 2 via the communication bus interface 3.

On the communication bus, bus devices can be connected to the communication module CM, for example at least one bus device BD1. The at least one bus device BD1, but also other bus devices can act as bus masters. Thus, while the communication module CM can initiate communication with the bus devices, also the at least one bus device BD1 can also initiate communication with the communication module CM on its own initiative.

The building technology device BTD may be formed by a luminaire, which is connectable to an IoT-network N and comprises the communication module CM as well as at least one bus device BD1.

The communication module CM on the one hand connects the building technology device BTD to the IoT-network N, but on the other hand is connected to a communication bus 2 to which the at least one bus device BD1 is detachably connected. This means, that the bus device can be exchanged by another bus device, but also that additional and different bus devices BD2 to BD4 (not shown) can be connected to the communication module CM via the communication bus 2.

The bus device BD1 is preferably an actuator, in particular an actuator for a lighting means. The lighting means may be formed by a LED-string with at least one LED.

The building technology device BTD may comprise additional bus devices which are not shown in the example of FIG. 1. Such additional bus devices can be for example sensors and/or actuators. Examples where more than one bus device BD1 is present will be explained more in detail with the examples of the subsequent figures.

The Bus device BD1 comprise a AC/DC converter or an DC/DC converter or a combination of both. The Bus device BD1 may be connected to a lighting means LM, e.g. a LED light source. The LED light source may be formed by a LED string with one or more LEDs, for emitting and optionally modulating light. The Bus device BD1 and the lighting means LM may be connected electrically and/or mechanically together.

The communication module CM can especially receive data from the communication bus 2 via the communication bus interface 3 and forward this received data, after a conversion due to the data format used on the communication bus, to the IoT-network N via the IoT-network interface 1. Also, the communication module CM is configured to receive data from the IoT-network N via the IoT-network interface 1 and forward this received data to the communication bus 2 via the communication bus interface 3, again after, if necessary, a conversion is performed.

For address assignment to the bus devices, the at least one bus device BD1 can trigger the assignment of an address by the communication module CM by sending a request to the communication module CM, indicating that an address should be assigned to the at least on bus device BD1. The assigned address can be stored in a non-volatile or persistent memory so that the address assignment could be only performed once after the first power-up of the building technology device. The address can then be re-used afterwards, by reading memory content. The communication module CM can comprise a memory unit for storing data and/or the at least one bus device BD1 can comprise a memory unit for storing data. Data can be stored in a look-up table.

The communication module CM preferably has a fixed bus address and generally serves as a bus master on the bus. However, for addressing, the at least one bus device BD1 acts as bus master and requests an address from the communication module on its own initiative. This is preferably true for all bus devices connected to the communication bus 2.

The bus device BD1 can send functionality information including information about at least one functionality provided by the at least bus device BD1 to the communication module CM.

At least one IoT-network device I may be connected to the IoT-network N. The communication module CM may be configured to receive IoT-request data from the at least one IoT-network device I on the IoT-network N, to store IoT-request data information, and to send an IoT-request to the at least one bus device BD1. The at least one bus device BD1 may be configured to receive the IoT-request and to send an IoT-answer to the communication module CM. The communication module CM may be configured to receive the IoT-answer from the at least one bus device BD1 and to send IoT-answer data on the at least one IoT-network device I on the IoT-network N using the stored IoT-request data information.

Figure 2:
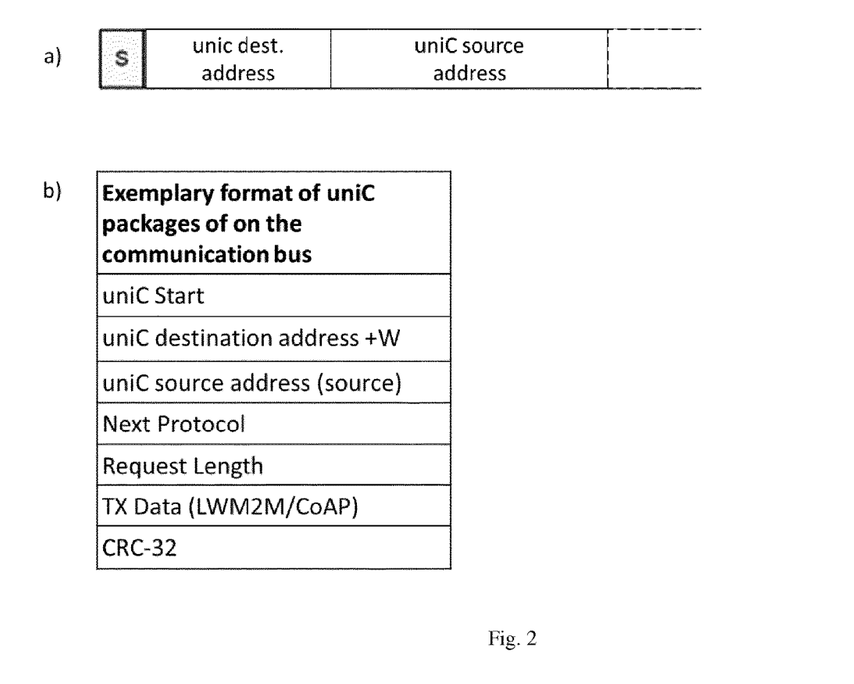
FIGS. 2a and 2b schematically illustrate a communication bus protocol.

A schematic and exemplary package format is shown in FIG. 2a, while FIG. 2b shows a more specific example of a communication bus package format. The communication bus is based on the I²C protocol. This protocol is extended to the so-called uniC protocol as described herein. The uniC start can correspond to the I²C start signaling of the start bit. The slave address of I²C with the write bit, e.g. of length 1 byte. Then, and differently from I²C a communication bus source address, preferably 1 byte, is provided. The communication bus source address can be in an 8-bit format, which, e.g., is a 7-bit address shifted left by one bit. If no address has been assigned to the at least one bus device, for example address 0000000b (a General Call Address) can be used. The field "next protocol" can include a source IPv6 address (e.g. 16 byte) and/or a source User Datagram Protocol (UDP) port (e.g. 2 byte). When the source IPv6 address and the UDP port is added, a mapping table on the communication module CM for mapping IPv6 IoT-network addresses on the IoT-network N to bus devices is provided. Of course, IPv4 addresses can be used as well. The field Request Length can be 2 byte long, while the field for the cyclic redundancy check (CRC-32) can be 4 byte long. The TX Data filed can be set to a predefined length, e.g. 63 to 511 bit, preferably 127 bit. This especially facilitates a bidirectional and/or asynchronous communication between the bus devices on the communication bus.

Figure 3:
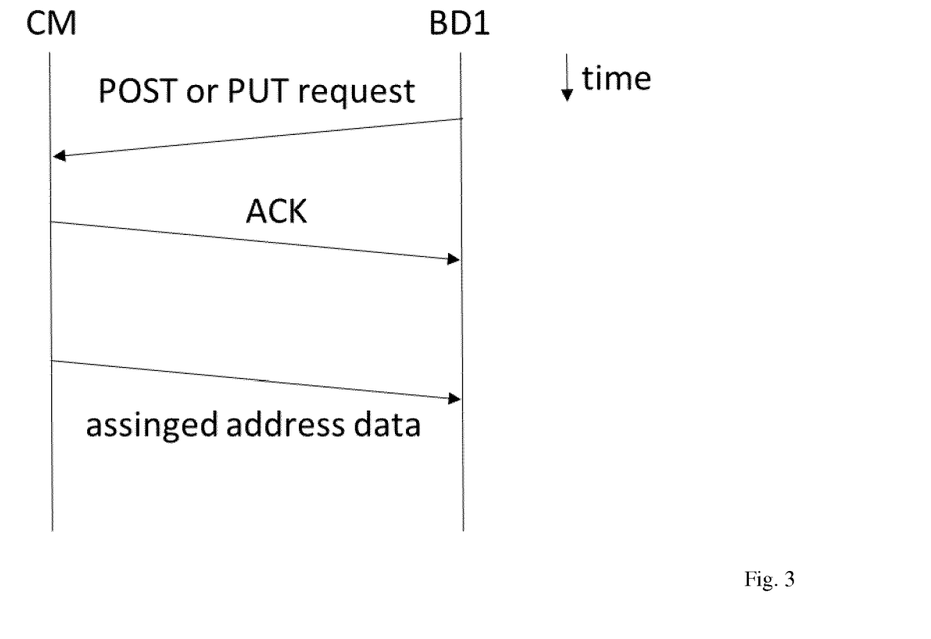
FIG. 3 schematically illustrates a communication between the bus device and the communication module.

The communication between the at least one bus device BD1 and the communication module CM for the address assignment can be triggered by the at least one bus device BD1 by sending a POST or PUT request, for example a JavaScript Object Notation (JSON), CBOR (Concise Binary Object Representation) or (HTTP-)link-formatted string, preferably in compressed form, to the communication module CM in answer of which the communication module CM responds with a new address, that is assigned for the at least one bus device BD1. With the POST or PUT request the at least one bus device BD1 can send an unique identifier (e.g. at least one of a bus device serial number and/or a Global Trade Item Number (GTIN), a MAC address, a Universally Unique Identifier (UUID)), a predefined value and/or hardware address to the communication module CM which is then used by the communication module CM to associate the address assigned at least one bus device BD1. In addition, other parameters can be transmitted to the communication module. An example for POST or PUT request is shown in FIG. 3, where the at least one bus device BD1 sends a POST or PUT request to the communication module CM, the communication module acknowledges receipt of the POST or PUT request and then sends to the at least one bus device BD1 the assign address data.

The communication module can be understood as working as a transparent gateway between the IP based IoT-network N and the bus devices on the communication bus 2, preferably of a building technology device. In particular, the bus devices connected to the communication bus 2 can advertise their functionality via the communication module CM to the external building technology management system (BTMS), preferably a light management system (LMS) then allows other IoT-network devices to access the functionality by the bus devices connected to the communication module CM.

A device I connected to the IoT-network, which can be a typical communication network, can find out a functionality of the building technology device, e.g. by querying the BTMS. Either the device I and/or the BTMS can then send a request to the communication module CM to access or use this functionality.

The communication module CM then receives a request from the IoT-network N, e.g. from device I, as IoT-request data, "transforms" the IoT-request data to a form suitable to be conveyed on the communication bus 2 and sends an IoT-request based in the IoT-request data on the bus to the bus device providing the functionality required to answer the request received with the IoT-request data. Of course, the request received with the IoT-request data can also require to send more than one IoT-requests on the communication bus to different bus devices. This is transparent for the device I. An answer to the request is sent from the at least one bus device BD1 back to the device I by sending an IoT-response via the internal bus to the communication module CM. The communication module converts the IoT-response from the package format used on the communication bus 2 to a package format used for transmission on the IoT-network N, e.g. to IP packages.

In case the communication module CM is built into or attached to a building technology device BTD, the bus devices can be for example sensors and/or actuators. The bus devices BD1 or their functionalities are then, by the transparent communication module CM, accessible from the IoT-network N so that data can be obtained by devices on the IoT-network N by sending IoT-request data via the IoT-network N to the building technology device. Similarly, actuators (sometimes called actors) can be controlled by the requests sent with the IoT-request data. That means that the bus devices BD1 can also be controlled from the IoT side of the communication module CM and e.g. sensor and/or actuator information can be read from a building technology device through the network. Actuators can be e.g. LED-Strings with control unit, AC/DC-converters, DC/DC-converters, etc.

Building technology devices BTD can also communicate with each other and the BTMS (directly) by using the IoT-network. The BTMS, of course, can communicate with all the building technology devices that provide at least one communication module. However, there can be no direct communication between the bus devices, but in some cases the communication module CM and the communication bus can be configured to allow indirect communication of the bus devices BD1 via the communication module CM.

The communication module CM, for communication on the IoT-network N, can store the address of a communication partner, e.g. device I (for example an IP source address of a request), for example in a look-up table or other storage means. Then the communication module CM can forward the IoT-request to the respective bus devices that can execute an action defined in the request or provide information according to the request. If a bus device on the bus answers to the IoT-request, the communication module CM then repurposes the IP source address stored and will send an answer to the initiator of the request sent with the IoT-request data by using the stored IP source address.

In a building technology communication system, in which a number of building technology devices BTD has to be commissioned, it is important that during set-up time the devices that are allowed to communicate with the building technology devices BTD are predefined and especially are listed in so-called "whitelist". This prevents unauthorized devices and/or users to influence the behavior and function of the building technology devices BTD. The communication module can be connected wirelessly or using a wired connection to the IoT-network N, which especially is an IPv6 based communication network.

It is important to note that the building technology devices BTD of the building technology communication system, addressed with addresses on the IoT-network N, can be configured in groups which can then be controlled together or simultaneously by, for example, other communication devices I on the IoT-network N. However, preferably only specific devices of the IoT-network N are to be allowed to directly control the building technology devices BTD, such as push button devices or other control means that can influence operation of a building technology device, e.g. a light emission spectrum of a luminaire. Also the IoT-network can be configured with other gateways to bus infrastructures such as a DALI, DSI or the DMX, and/or Lux-Mate bus. Also bus devices on the communication bus 2 can provide access to other bus infrastructures.

The connection of the bus devices to the communication module CM can for example be facilitated by a two-wire or four-wire connection ("telephone cable"). Two of the wires used for bus signaling purposes (SDA, SCL) as known from I$^2$C. In case of a four-wire connection, the additional wires can provide a low power supply of 3 to 10 volts, preferably 5V. If more wires are used, for example in a 6 wire connection, the additional wires can be used for high power supply of the devices connected to the communication bus 2. An exemplary wiring uses 4P4C or 6P6C cabling. In the latter case the two additional wires for example can provide a 48 Volt power supply. Of course, also a higher or lower voltages could be provided, if required.

The communication module CM can also be provided with different physical connectors and be configured for different physical layers. For example, for Ethernet, PoE and/or other infrastructures and/or physical layers or data link layers. An example is 6LoWPAN with a 802.15.4 physical layer as defined in the corresponding IEEE standard. The connection to the IoT-network N can be wired or wireless.

In case no power is provided by or via the communication module CM to the communication bus 2, additional power supplies can be provided in the building technology device BTD. Examples can be AC/DC and/or DC/DC converters connected to the bus, but energy storage devices such as a battery. If a power supply is connected to the communication bus 2 and/or is integrated in the bus technology device BTD, of course this power supply can also be used to provide power to devices on the IoT-network N. In this case the building technology device BTD and/or the communication module can have a suitable interface, e.g. a Power-over-Ethernet (POE) interface.

Figure 4:
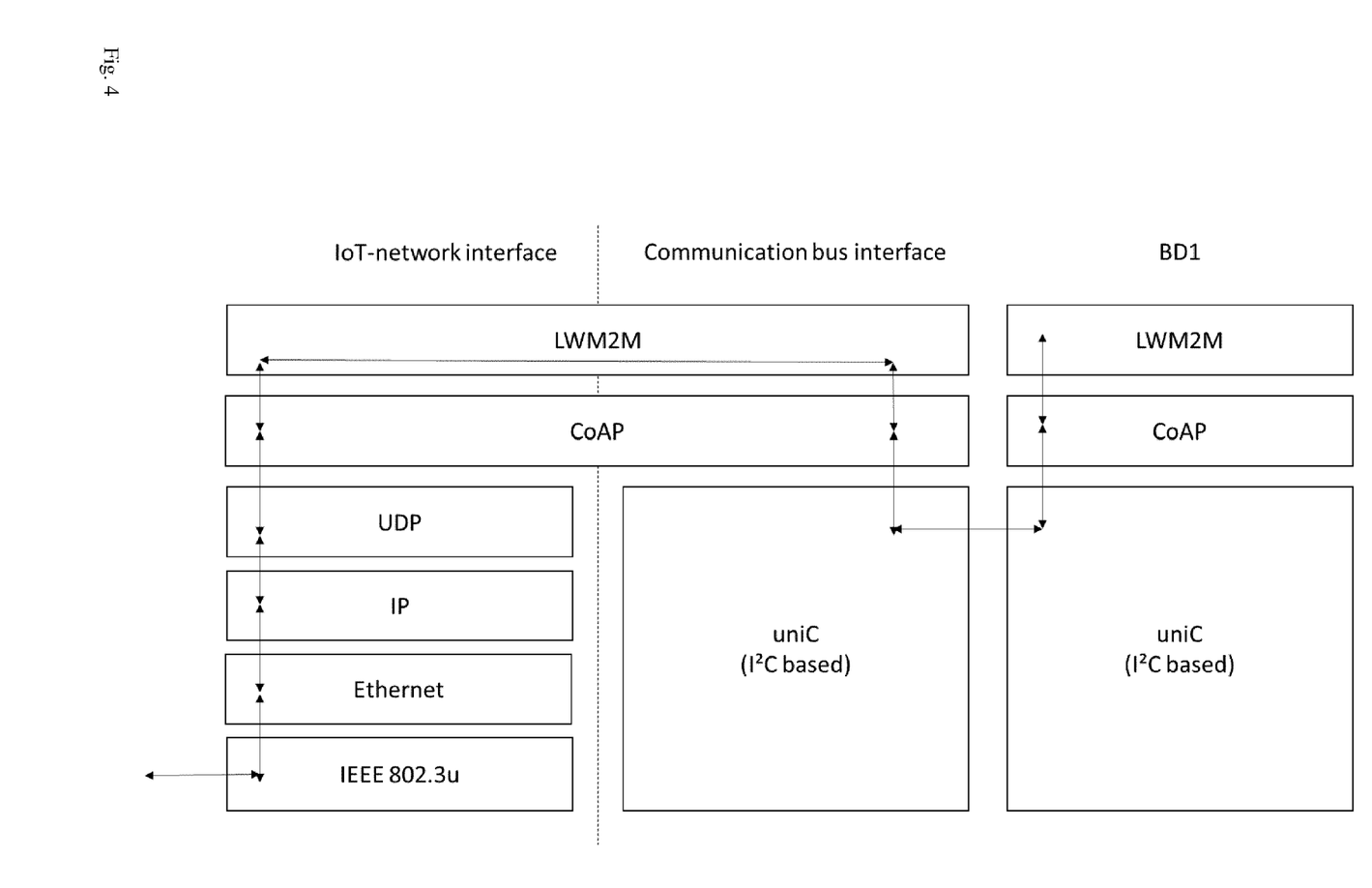
FIG. 4 shows schematically and exemplary network stacks used.

On the communication bus 2, the communication module CM preferably has a fixed and predefined communication bus address. This is advantageous as bus devices connected on the communication bus 2 know under which address the communication module CM is reachable and hence know the address to which requests have to be sent. When the communication module CM receives data on the communication bus 2, the communication module CM converts the received data and in particular a data package format used on the communication bus to a data package format used on the IoT-network N. Of course, coming from the IoT-network N, the communication module CM can also convert a data package format used on the IoT network N to a data package format used on the communication bus 2. As shown in FIG. 4, the IoT-network interface 1 can be an Ethernet based interface and therefore may use an IP stack implementation using the Ethernet physical layer (PHY) and the Ethernet data link layer (MAC). In FIG. 4, IEEE 802.3u denotes a standard defining the physical layer and data link layer's media access control (MAC) of wired Ethernet. Physical connections are made between nodes and/or infrastructure devices (hubs, switches, routers) by various types of cable. IEEE 802.3u especially identifies 100BASE-TX, 100BASE-T4, 100BASE-FX Fast Ethernet at 100 Mbit/s (12.5 MB/s) with auto-negotiation. Of course, other physical and datalink layers can be used as defined by IEEE 802, IEEE 802.11 (wireless LAN and mesh networks), or IEEE 802.15 based network, such as IEEE 802.15.1 to IEEE 802.15.4.

Figure 5:
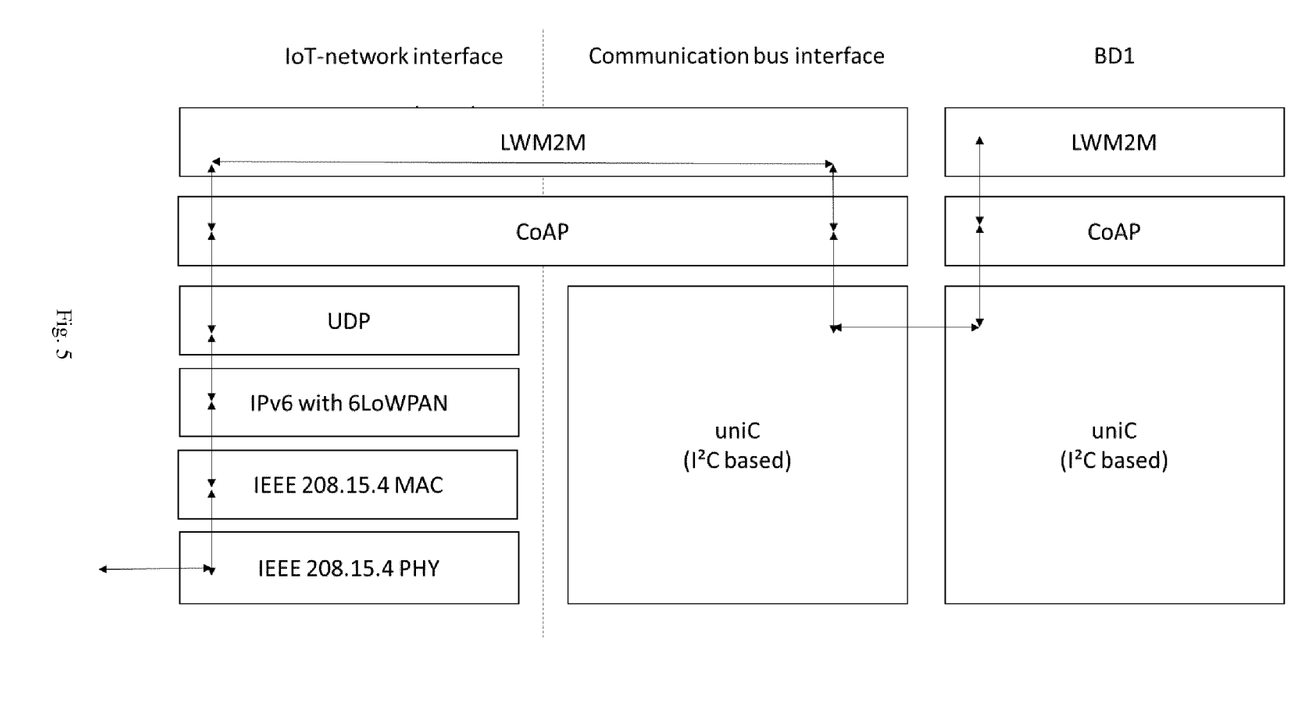
FIG. 5 shows schematically and exemplary network stacks used.

An example using IEEE 802.15.4 is shown in FIG. 5. Here, the physical layer and media access control for low-rate wireless personal area networks (LR-WPANs) is used in an implementation of an IoT-network stack as, e.g., defined in the Thread specification (Thread Stack Fundamentals: http://threadgroup.org/Portals/0/documents/whitepapers/Thread%20Stack%20Fundamentals_v2_public.pdf).

In FIGS. 4 and 5, IP refers to the Internet Protocol (IP), which is the principal communication protocol in the Internet protocol suite for relaying datagrams across network boundaries. Its routing function enables internetworking, and essentially establishes the Internet. IP has the task of delivering packets from a source device to the destination device solely based on the IP addresses in the packet headers. For this purpose, IP defines packet structures that encapsulate the data to be delivered. It also defines addressing methods that are used to label the datagram with source and destination information. The first major version of IP, Internet Protocol Version 4 (IPv4), is the dominant protocol of the Internet. Its successor is Internet Protocol Version 6 (IPv6).

UDP refers to the User Datagram Protocol. It uses a simple connectionless transmission model with a minimum of protocol mechanism. It has no handshaking dialogues, and thus exposes unreliability of the underlying network protocol. There is no guarantee of delivery, ordering, or duplicate protection. UDP provides checksums for data integrity, and port numbers for addressing different functions at the source and destination of the datagram. With UDP, messages can be sent, in this case referred to as datagrams, to other devices on an Internet Protocol (IP) network without prior communications to set up special transmission channels or data paths. UDP is suitable for purposes where error checking and correction is either not necessary or is performed in the application, avoiding the overhead of such processing at the network interface level. If error correction facilities are needed at the network interface level, the Transmission Control Protocol (TCP) or Stream Control Transmission Protocol (SCTP) can be used instead.

The Constrained Application Protocol (CoAP) is used as next layer. It is a protocol intended to be used in electronic devices that allows them to communicate interactively over the Internet. It is particularly targeted for small low power sensors, switches, valves and similar devices that need to be controlled or supervised remotely, through standard Internet networks. CoAP is an application layer protocol that is intended for use in resource-constrained Internet devices. CoAP is designed to easily translate to HTTP for simplified integration with the web, while also meeting specialized requirements such as multicast support, very low overhead, and simplicity. Multicast, low overhead, and simplicity are extremely important for IoT and Machine-to-Machine (M2M) devices.

On the highest layer, LWM2M refers to the Lightweight M2M protocol from the Open Mobile Alliance for M2M or IoT device management and is frequently used with CoAP.

In FIG. 5, 6LoWPAN refers to "IPv6 over Low power Wireless Personal Area Networks" and is the name of a concluded working group in the Internet area of the IETF. It defines encapsulation and header compression mechanisms that allow IPv6 packets to be sent and received over IEEE 802.15.4 based networks. IEEE 802.15.4 devices provide communication-ability in the wireless domain. The base specification developed by the 6LoWPAN IETF group is RFC 4944 (updated by RFC 6282 with header compression, and by RFC 6775 with neighbor discovery optimizations). The problem statement document is RFC 4919.

The double headed arrows in FIGS. 4 and 5 illustrate the path data exchanged between the at least one bus device BD1 and the IoT-network takes in view of the used network layers.

On the communication bus side of FIGS. 4 and 5, the LWM2M and CoAP layers are implemented on top of the uniC stack, defined above, which is $I^2C$ based. Bus devices connected to the communication bus show corresponding implementations, but the layers on top of uniC and/or CoAP can also be differently implemented. The difference between the typical $I^2C$-bus as defined by the Philips standard, is the communication bus data sent on the communication bus 2 not only comprises a destination address field in the data packages but also a source address indicating a bus device at which data originates.

In the conversion of data package formats, the communication module CM performs a transparent conversion, which means that the conversion is not visible to IoT-network devices on the IoT-network N nor the bus devices on the communication bus 2.

The communication module can receive a request for an assignment of a communication bus address on the communication bus, wherein the request includes a communication bus address of the at least one bus device BD1 connected to the communication bus 2. This communication bus address can be a unique identifier of the at least one bus device BD1 or a unique identifier of the at least one bus device BD1, such as a hardware address or MAC address. The communication module CM then assigns an address by associating the address with the unique identifier of the bus device BD1. The communication bus address and the unique identifier can for example be stored in a persistent or volatile memory, such as a RAM or ROM, and can be especially stored in a look up table. If the association is stored in a persistent memory, the communication module CM can reuse this information even after a power supply of the communication module CM is interrupted.

The communication module CM then sends communication bus address data to the at least one bus device BD1, which include the assigned addressed and the unique identifier of the bus device BD1. Therefore, the communication bus address data is sent specifically to the bus device BD1.

In particular, the communication module CM can receive IoT-request data from the IoT-network N, which basically is a communication network. The IoT-request data contains requests from IoT-network devices, e.g. device I, on the IoT-network N. The communication module CM can store IoT-request data information related to the IoT-request data and in particular a source address and a context of the requests, so that later on, this information can be used to send out IoT-answer data to the respective IoT-network device from which the IoT-request data was received. The context for example can include address(es), security material, message sequence number, etc.

The communication module CM then determines which bus devices on the communication bus 2 are required to answer the request contained in the IoT-request data. For this, the communication module CM can store information about what bus device is required for which type of request. The communication module CM can then send an IoT-request to the at least one bus device BD1 on the communication bus 2 in an effort to answer the requests of the IoT-request data. The communication module then sends an IoT-request to the at least one bus device BD1 or number of bus devices and waits for an IoT-answer received on the communication bus for the request contained in the IoT-request data. The IoT-request data information is preferably stored in a persistent or volatile memory and especially in a buffer memory. The information can be stored by way of a look-up table. The communication module CM then determines the context in which the IoT-request data was received, and, based on the IoT-request data information, sends IoT-answer data to the respective IoT-network device I or more network devices.

In order to determine which functionality is provided by which bus device connected to the communication bus 2, the communication module CM is configured to receive functionality information including information about at least one functionality of the at least one bus device BD1 on the communication bus 2. The communication module CM can then forward this functionality information to a building technology management system (BTMS) for example the light management system LMS. The building technology management system can serve as a repository for functionality information provided by the building technology devices on the IoT-network and can be capable of forwarding respective IoT-request data to respective building technology devices. The communication module CM of a building technology device BTD is then capable of determining the specific bus device which provides the functionality requested suitable for answering the request contained in the IoT-request data. Of course, the building technology management system can store all functionalities for a bus technology device, while on the other hand the communication module knows which specific bus device is necessary to provide a specific functionality. The communication module CM can therefore also split up IoT-request data according to a requested functionality and send specific IoT requests to the at least one bus device BD1. The communication module CM can also combine IoT-answers received from the communication bus 2 in order to answer requests that require functionalities of multiple bus devices.

The communication module CM can also recognize changes on the communication bus 2, for example if a bus device is removed or exchanged and/or if a different bus device is connected additionally to the bus or replaces a previously connected bus device. Especially, a bus device BD1 is attachable or removably connected to the communication bus 2 and can operate as a bus master. In particular, the bus device BD1 can request assignment of a bus address by sending a request to the communication module, which is present at a fixed address on the communication bus 2. However, the at least one bus device BD1 does not always need to act as bus master but can selectively act as a bus master to initiate communication with the communication module CM.

The at least one bus device, as well as optionally the communication module CM can provide a volatile or persistent memory to store or buffer the assigned address. If the memory is persistent, even after an interruption of a power supply the at least one bus device BD1 can read the assigned address from the memory after the at least one bus device BD1 is powered-up again.

Of course, the bus device BD1 can receive and evaluate an IoT-request sent by the communication module CM and perform an action defined in the IoT-request according to a functionality provided by the at least one bus device BD1. The functionality provided by the at least one bus device BD1 can be advertised by the at least one bus device BD1 to the communication module, which then, in turn, can forward the functionality information to the management system, preferably the building technology management system BTMS. The at least one bus device BD1, which preferably is a sensor or actuator, and in particular an actuator connected to a lighting means, for example comprising an LED-string with at least one LED, can therefore send functionality information including information about at least one functionality provided by the at least bus device BD1 to the communication module CM. The at least one bus device can also be a gateway to other bus infrastructures such as a DALI-bus and a DMX-bus and/or a LuxMate-bus. Also, a bus device can be provided that serves as a power supply. The power supply can be provided as a battery or, for example, as an AC/DC or DC/DC converter.

The communication module, the bus devices and the communication bus can preferably be part of the building technology device BTD. However, the communication module can also be a separate module that is configured to connect a building technology device, e.g. a luminaire, to the IoT-network N. In case the building technology device is provides a bus connection or respective connectors, the communication module can be connected to the bus of the building technology device, e.g. by respective complementary connectors.

In the building technology communication system, at least one building technology device BTD with the communication module CM and the at least one bus device BD1 is connected. The building technology communication system is part of or at least partially contains portions of the IoT-network N. The building technology communication system can, of course a plurality of building technology devices. The building technology management system BTMS can also connected to the IoT-network N. The building technology management system BTMS can store the functionality information representing functionalities provided by the at least one building technology device BTD, in particular by the at least one bus device of the building technology device BTD. The at least one bus device BD can send the functionality information about its at least one functionality to the communication module CM. The communication module CM is configured to send the functionality information about the at least one functionality to the building technology management system BTMS. The building technology management system BTMS receives functionality requests from at least one IoT-network device I and/or sends the stored functionality information to the IoT-network device I. The building technology management system BTMS can also forward the functionality request to the at least one building technology device BTD providing the functionality according to the stored functionality information. The building technology management system BTMS also can forward communication between the at least one IoT-network device I and the at least one building technology device BTD providing the functionality. The building technology management system BTMS can alternatively and/or additionally send stored functionality information to the at least one IoT-network device I indicating at least the at least one building technology device providing the requested functionality. The IoT-network device I can then engage in communication with the at least one building technology device based on the functionality information received by the at least one IoT-network device from the building technology communication system BTMS.

In the building technology communication system at least a second building technology device can be connected. At least one communication module CM of the first building technology BTD device can directly communicate with the communication module of the second building technology device. The building technology devices can be configured in one control group but in different subnets. The at least one communication module CM. The building technology management system BTMS can store a list of IoT-network devices I allowed to communicate with the building technology device BTD, especially during a commissioning phase of the building technology communication system. The building technology management system can store a list of IoT-network devices allowed to communicate with the at least one building technology device BTD. The building technology management system can store security information relating to least one building technology device BTD at at least one IoT-network device I.

In the building technology communication system, at least one authorized IoT-network device I may be allowed to communicate via the IoT-network N with the building technology device BTD, especially during a commissioning phase of the building technology communication system. This authorized IoT-network device I may store the functionality information representing functionalities provided by the at least one building technology device BTD and/or security information relating to least one building technology device BTD, in particular by the at least one bus device of the building technology device BTD. The at least one bus device BD can send the functionality information about its at least one functionality to the communication module CM. The communication module CM is configured to send the functionality information about the at least one functionality to the authorized IoT-network device I. The authorized IoT-network device I may receive from and/or send functionality requests to the at least one building technology device BTD providing the functionality according to the stored functionality information. The authorized IoT-network device I also can forward communication between the at least one IoT-network device I and the at least one building technology device BTD providing the functionality. The authorized IoT-network device I can alternatively and/or additionally send stored functionality information to the at least one IoT-network device I indicating at least the at least one building technology device providing the requested functionality. Additional IoT-network devices I can then engage in communication with the at least one building technology device based on the functionality information received by the at least one IoT-network device from the authorized IoT-network device I.

The authorized IoT-network device I may be a cloud service or cloud server. The authorized IoT-network device I may be alternatively or additionally a local server, a personal computer, a smartphone, a tablet PC or other computer systems able to act as an IoT-network device and having the authorization to perform such actions.

Other IoT-network device I may be a cloud service or cloud server, a local server, a personal computer, a smartphone, a tablet PC. Other IoT-network devices may be like printers, POE-cameras, POE-phones, POE-routers and other devices able to act as an IoT-network device.

Figure 6:
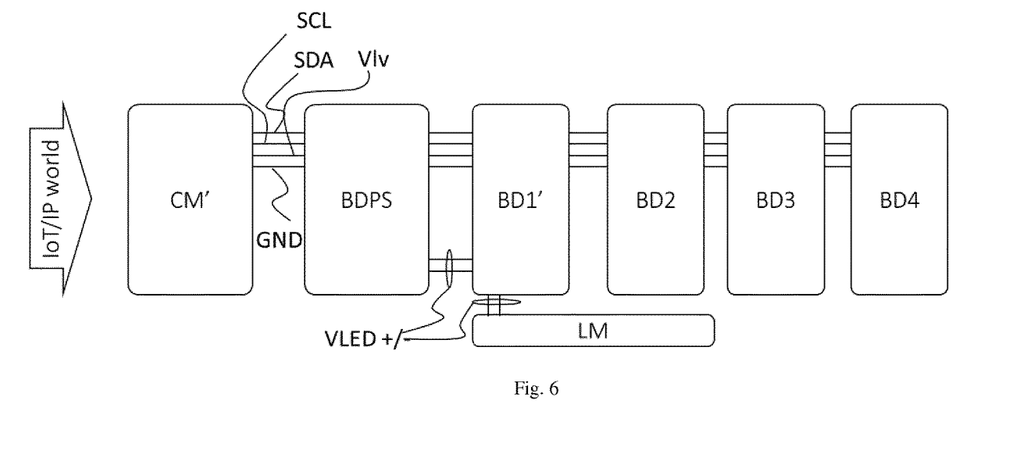
FIG. 6 shows an example of a bus technology device.

FIG. 6 shows an example, in which a communication module CM' is connected to a number of bus devices BD1-BD4. Bus device BD1' can be a visual light communication (VLC) modulator connected to a lighting means LM, e.g. a light engine, LED light source and/or LED string with one or more LEDs, for emitting light. The Bus device BD1' has a visual light communication (VLC) modulator may be formed by a DC/DC converter, AC/DC converter or switching unit which is connected to a lighting means LM, e.g. a light engine, LED light source and/or LED string with one or more LEDs, for emitting and modulating light. The bus devices BD2-BD4 in this example are sensors or peripheral devices. Of course, these devices can also be actuators such as motors, e.g. for blinds. Also, a bus device BDPS is shown, which is a power supply that supplies bus device BD1' as well as the lighting means. The bus device BDPS may comprise a switched converter which supplies bus device BD1' with constant current or constant voltage. The communication module CM' and the bus devices BD1'-BD4 as well as the bus device BDPS are connected by a four-wire connection, in which two wires are used for a bus signaling SDA, SCL, one line is ground GND, which together with a low voltage potential $V_{LV}$ forms a low power supply for example 5 volt. Due to the flexibility in the configuration at least of the bus devices BD1'-BD4 can be changed and the number of bus devices connected to the communication module CM' can be extended or reduced.

Of course, a building technology device can also comprise more than one communication module, or a communication module CM", CM' can comprise more communication interfaces. This is, for example, shown in FIGS. 7a, 7b, 7c and 7d.

Figure 7A:
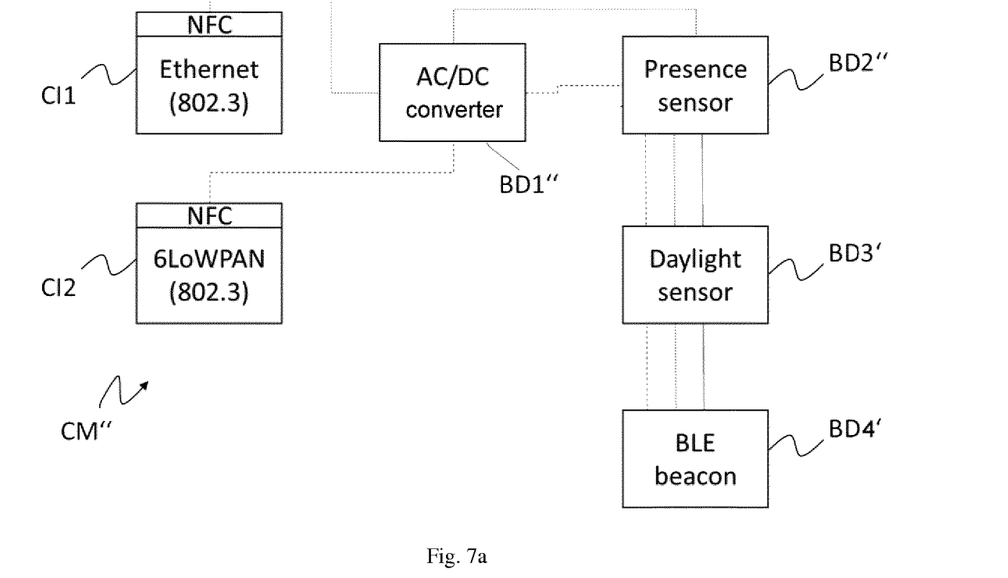
FIGS. 7a, 7b, 7c and 7d show other examples of a bus technology device.

In FIG. 7a, a building technology device is shown with three communication modules, or a communication module CM" with three communication interfaces CI1-CI2 is exemplarily shown. The communication module CM" which can alternatively or simultaneously connect to IP based networks using communication interfaces CI1-CI3 and to the communication bus 2. Power can be supplied either from the communication module CM' or an AC/DC converter circuit. Exemplarily, communication interfaces CI1-CI2 can be linked to an NFC module, which can be used to send and receive data of the communication module CM". Communication interface CI1 may be powered from an external energy source, e.g. AC mains voltage. Communication interface CI1 can be connected with the bus device BD1" using a wired connection. Communication interface CI1 may be formed by a border router. Communication interface CI2 may be powered from an external energy source, e.g. AC mains voltage or alternatively from an internal energy storing unit, e.g. batteries or energy harvesting elements like photo diodes or photocells. Communication interface CI2 can be connected with the bus device BD1" wirelessly (using a wireless connection. Communication interface CI1 may be formed by a wireless border router. Communication bus 2 thus may use a wired or wireless communication. Bus device BD1" is formed by an actuator. Bus device BD1" is an example where the bus device is formed by AC/DC converter which may supply the lighting means LM and/or other bus devices with power. Bus devices BD2", BD3', BD4' formed as a sensor are for example a presence sensor (BD2"), a daylight sensor (BD3') and/or a bluetooth (bluetooth low energy, BLE) beacon (BD4').

Figure 7B:
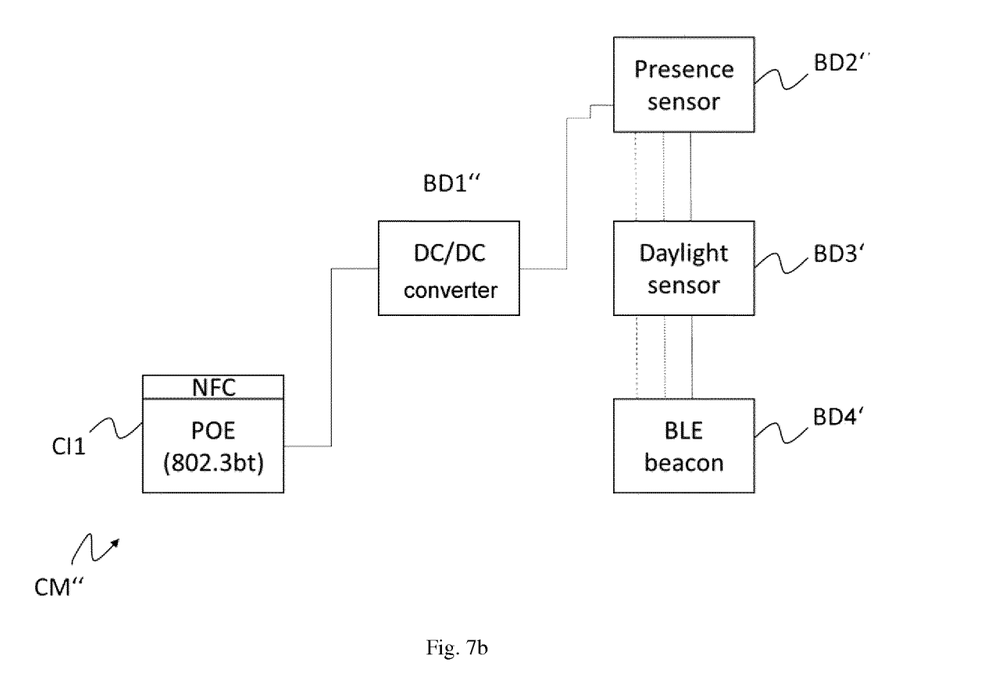

In FIG. 7b, a building technology device is shown with one communication module, or a communication module CM" with one communication interface CI1' is exemplarily shown. In FIG. 7b similar setup is shown as in FIG. 7a. Communication bus 2 in this case is a power-over-Ethernet (POE) communication interface, which means that there is a wired communication and power to the bus devices can be supplied from the network. Communication interface CI1 may be formed by a PoE switch. Communication interface CI1 may be powered from an external energy source, e.g. AC mains voltage. The communication module CM" which can alternatively or simultaneously connect to IP based networks using communication interface CI1 and to the communication bus 2. Power can be supplied either from the communication module CM' and/or a DC/DC converter circuit. Exemplarily, communication interface CI1 can be linked to an NFC module, which can be used to send and receive data of the communication module CM". Bus devices BD1" as shown here is an example where at least one bus device is formed by an actuator. Bus devices BD1" is an example where the bus device is formed by DC/DC converter which may supply the lighting means LM and/or other bus devices with power. The power may be first supplied by the communication interface CI1 and may be forwarded and/or converted via the bus device BD1" to the other bus devices. Bus devices BD2", BD3', BD4' formed as a sensor are for example a presence sensor (BD2"), a daylight sensor (BD3') and/or a bluetooth (bluetooth low energy, BLE) beacon (BD4').

Figure 7C:
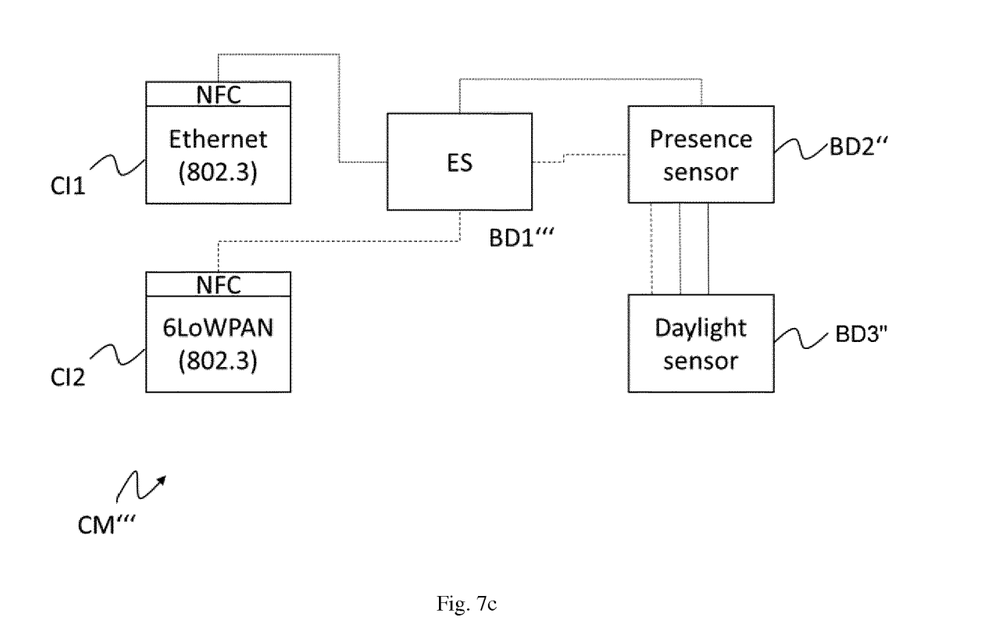

In FIG. 7c a similar setup is shown as in FIG. 7a with a communication module CM'". However, an energy storage ES, which acts as bus device BD1", e.g. a battery or other external power supply unit, is used to supply the bus devices BD2" and BD3". The energy storage ES can be fed by communication modules CM'" and/or the two communication interfaces CI1-CI2. Of course, the energy storage ES may supply the communication modules CM' and can be additionally or alternatively combined with an AC/DC battery charger circuit. As an alternative the communication interfaces CI1-CI2 may comprise an internal energy storing unit, e.g. battery or energy harvesting elements like photo diodes or photocells. Communication interface CI1 can be connected with the bus device BD1" using a wired connection. Communication interface CI2 can be connected with the bus device BD1" wirelessly (using a wireless connection on the communication bus 2). Communication interface CI2 may be powered from an external energy source, e.g. AC mains voltage or alternatively from an internal energy storing unit, e.g. battery or energy harvesting elements like photo diodes or photocells.

Figure 7D:
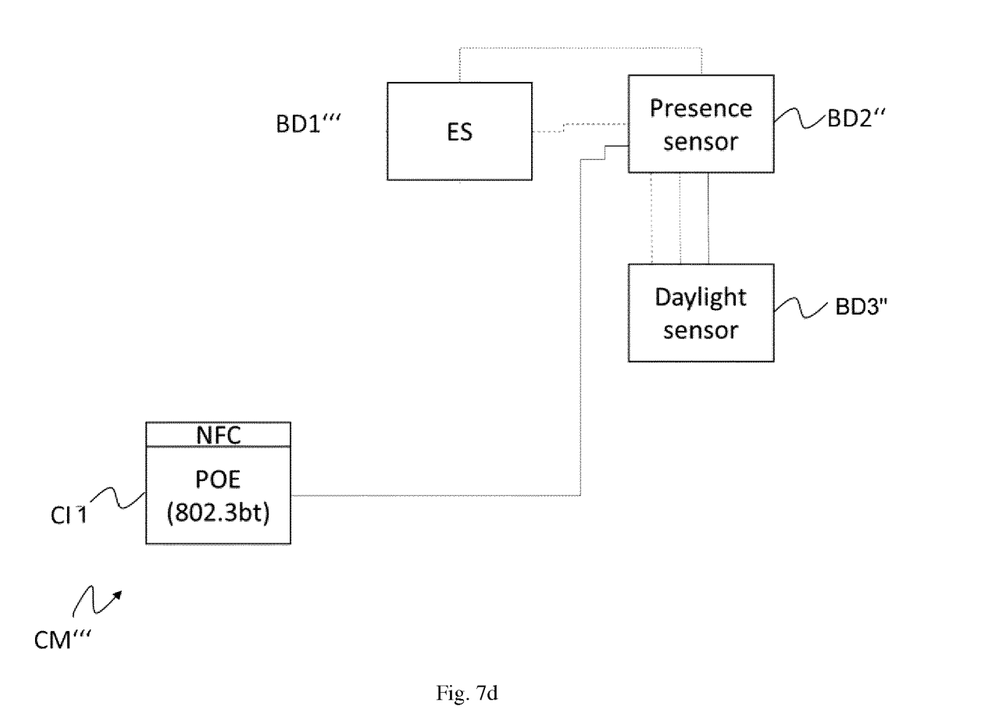

In FIG. 7d a similar setup is shown as in FIG. 7b with a communication module CM'". Again, communication interface CI1 in this case is a power-over-Ethernet (POE) communication interface, which means that power can be supplied from the network. Similar to the example of FIG. 7c, an energy storage ES, which acts as bus device BD1", e.g. a battery or other external power supply unit, is used to supply the bus devices BD2" and BD3". The energy storage ES can be fed by communication module CM' and/or the communication interface CI1. Of course, the energy storage ES can also supply the communication module CM'" and can be additionally or alternatively combined with a AC/DC battery charger circuit.

The communication module can implement the IP stack, but also crypto algorithms. So, the building technology devices and/or the bus devices appear to behave like IP connected devices. Since all components of a building technology device can be connected to a communication module, the building technology management system sees only one building technology device. Hence the number of building technology devices that need to be implemented and commissioned is reduced. As previously described, sensors and/or actuators can later be added that have not been available at the time the building technology device was installed/produced/commissioned, which use the same communication bus and communication module. CRUD (an acronym for "create, read, update and delete", which refers to all of the major functions that are implemented in database applications and can map to a standard SQL statement, HTTP method as is typically used to build RESTful APIs) and/or "Restful operations" (cf. https://en.wikipedia.org/wiki/Representational_state_transfer) can be implemented using the protocol on the communication bus technology. This implies that behavior of sensors, actuators or other (bus) connected devices can be changed by adding new resources, while the communication module and/or the communication bus does not need to change.

The invention claimed is:

1. A communication module (CM) for a building technology device (BTD), comprising:
a processing circuit, an IoT network interface (1) that sends and receives data from the communication module to an IoT network using an Internet Protocol data packet format, and a communication bus interface (3) that sends and receives data from the communication module over a communications bus to one or more building devices in a building technology system using a second data packet format that is not an Internet Protocol;
wherein the communication module is a transparent gateway between the IoT network and the communication bus and is configured for bi-directional communication on the IoT-network (N) and over the communication bus (2), and the communication module (CM) is configured to convert communication data between the Internet Protocol data packet format for communicating on the IoT-network (N) and the second data packet format for communicating over the communication bus; and further wherein:
the communication module (CM) is configured to receive IoT-request data from the IoT-network (N), to store IoT-request data information, and to send an IoT-request on the communication bus (2) according to the IoT-request data;
the communication module (CM) is configured to store the IoT-request data information;
the communication module (CM) is configured to receive an IoT-answer on the communication bus (2) and to send IoT-answer data on the IoT-network (N) using the stored IoT-request data information;
the communication module (CM) is configured to receive functionality information including information about at least one functionality of the at least one bus device (BD) on the communication bus and is configured to forward the functionality information on the IoT-network (N), to a predetermined IoT-network address.

2. The communication module (CM) according to claim 1, wherein the communication module (CM) is configured to be a bus master, and is configured with a fixed address on the communication bus (2).

3. The communication module according to claim 1, wherein: the communication module (CM) is configured to receive a request for assignment of a communication bus address on the communication bus (2), the request for assignment of a communication bus address including identifier data, a communication bus source address, a hardware address, and/or a unique identifier of at least one bus device (BD1);
the communication module (CM) is configured to assign an address and to respond to the request for assignment of a communication bus address by sending the assigned address with communication bus address data, including the identifier data, on the communication bus (2);
the communication module (CM) is configured to store the identifier data in association with the assigned address; and
the communication module (CM) is configured to read a stored assigned address when the communication module (CM) is powered up.

4. The communication module according to claim 1, wherein the communication module (CM) is detachably connected to the at least one bus device by a four wire connection wherein two of the four wires are configured as a power supply and wherein the communication module (CM) is configured to communicate and assign addresses to changed or added bus devices (BD1') on the communication bus and to register removed bus devices.

5. A building technology device, comprising
a communication module (CM) according to claim 1, configured to connect the building technology device to an IoT-network (N); and
a communication bus (2) connected to the communication module (CM), configured to detachably connect the communication module (CM) to at least one bus device (BD1) wherein the communication module (CM) is configured for a bi-directional communication with the at least one bus device (BD1) and the IoT-network (N).

6. The building technology device according to claim 5, wherein
the communication module (CM) is configured to receive IoT-request data from the IoT-network (N), to store IoT-request data information, and to send an IoT-request to the at least one bus device (BD1) according to the IoT-request data, wherein
the IoT-request data information is a source address in the IoT-network (N), and is stored in a look-up table in the storage unit;
the at least one bus device (BD1) is configured to receive the IoT-request, evaluate the IoT-request and to send an IoT-answer to the communication module (CM); and
the communication module (CM) is configured to receive the IoT-answer from the at least one bus device (BD1) and to send IoT-answer data on the IoT-network (N) using the stored IoT-request data information, and wherein the at least one bus device (BD1) performs an action according to the IoT-request.

7. The building technology device according to claim 5, wherein
the at least one bus device (BD1) is configured to initiate a communication with the communication module (CM),
the communication module (CM) and/or the at least one bus device (BD1) comprises a storage unit, which is configured to store the address assigned to the at least one bus device (BD1), and
the communication module (CM) and/or the at least one bus device (BD1) are configured to read the stored assigned address when the communication module (CM) and/or the at least one bus device (BD1) is powered up; and the building technology device (BTD) comprises at least a second bus device (BD2), wherein the at least one bus device (BD1) is configured to communicate indirectly with the second bus device (Bd2) on the communication bus (2) via the communication module (CM), and wherein the second bus device (BD2) is a battery.

8. A building technology management system (BTMS), configured to be connected to an IoT-network, wherein
the building technology management system is configured to store functionality information representing functionalities provided by at least one building technology device (BTD) according to claim 5, by the at least one bus device (BD1) of the building technology device (BTD).

9. The communication module recited in claim 1 wherein the IoT Network interface comprises at least the following layers:
a UDP layer (User Datagram Protocol), a CoAP layer (Constrained Application Protocol), and an LWM2M layer (Light Weight Machine to Machine protocol) that pass and receive data from an IP layer in which data is configured in an Internet Protocol (IP) data packet format, and the IP layer communicates with an Ethernet MAC layer on an Ethernet physical layer; and
the communication bus interface comprises at least the following layers:
the CoAP layer (Constrained Application Protocol), and the LWM2M layer (Light Weight Machine to Machine protocol) that pass and receive data from a uniC layer in which data is configured in a uniC data packet format.

10. The communication module recited in claim 1 wherein the IoT Network interface comprises at least the following layers:
a UDP layer (User Datagram Protocol), a CoAP layer (Constrained Application Protocol), and an LWM2M layer (Light Weight Machine to Machine protocol) that pass and receive data from an IPv6 with 6LoWPAN layer in which data is configured in a Thread data packet format, and the IPv6 with 6LoWPAN layer communicates with an IEEE 208.15.4 MAC layer on an IEEE 208.15.4 physical layer; and
the communication bus interface comprises at least the following layers:
the CoAP layer (Constrained Application Protocol), and the LWM2M layer (Light Weight Machine to Machine protocol) that pass and receive data from a uniC layer in which data is configured in a uniC data packet format.

11. A bus device for a communication bus, wherein the bus device (BD1) is detachably connected by the communication bus (2) to a communication module (CM) according to claim 1, wherein
the bus device (BD1) is configured to selectively operate as a bus master, and wherein
the bus device (BD1) is configured to initiate a communication with the communication module (CM), and is configured to send a request for assignment of a communication bus address to the communication module (CM) via the communication bus (2), including identifier data, preferably a communication bus source address, a hardware address, and/or a unique identifier of the bus device (BD1).

12. The bus device according to claim 11, wherein, the bus device (BD1) is configured to receive an assigned address with communication bus address data from the communication module (CM) and is configured to store the assigned address, and wherein the bus device (BD1) is configured to read the stored assigned address when the bus device (BD) is powered up; and wherein
the bus device (BD) is configured to receive an IoT-request, to evaluate the IoT-request and to send an IoT-answer to the communication module (CM); and wherein
the bus device (BD1) performs an action associated with the IoT-request.

13. The bus device according to claim 11, wherein the bus device (BD1) is a sensor or an actuator;
the bus device (BD1) is a gateway to other bus infrastructures such as a DALI, DSI or the DMX, and/or LuxMate bus, and/or comprises a power supply;
the bus device (BD1) is configured to communicate indirectly with another bus device (BD2) on the communication bus (2) via the communication module (CM);
the bus device (BD1) is configured to send functionality information including information about at least one functionality of the bus device to the communication module (CM); and
the bus device (BD1) is configured to initiate a communication on the communication bus (2), with at least one communication module (CM) on the communication bus (2).

14. A building technology communication system, comprising at least one building technology device (BTD) according to claim 5 with a communication module (CM) and at least one bus device (BD1) wherein the communication module (CM) is connected to an IoT-network (N), and
at least one IoT-network device (I) connected to the IoT-network (N), wherein
the communication module (CM) is configured to receive IoT-request data from the at least one IoT-network device (I) on the IoT-network (N), to store IoT-request data information, and to send an IoT-request to the at least one bus device (BD1),
the at least one bus device (BD1) is configured to receive the IoT-request and to send an IoT-answer to the communication module (CM), and
the communication module (CM) is configured to receive the IoT-answer from the at least one bus device (BD1) and to send IoT-answer data on the at least one IoT-network device (I) on the IoT-network (N) using the stored IoT-request data information.

15. A building technology communication system according claim 14, wherein the building technology communication system (BTMS) comprises: at least a second building technology device comprising a communication module, wherein the at least one communication module (CM) of the at least one building technology device (BTD) is configured to directly communicate with the communication module (CM') of the at least one second building technology device, and
the at least one building technology device (BTD) and the at least one second building technology device are configured in a control group and in different subnets; wherein
the at least one communication module (CM) and/or the building technology management system (BTMS) is configured to store a list of IoT-network devices allowed to communicate with the at least one building technology device (BTD), during a commissioning phase of the building technology communication system.

16. A building technology device (BTD) comprising:

a communication module (CM) configured to connect to an IoT-network (N) and to connect to a communication bus (2), and configured for bi-directional communication on the IoT-network (N) and on the communication bus (2), wherein the communication module (CM) is further configured to convert communication data between the communication bus (2) and the IoT-network (N), and the communication bus (2) is configured to detachably connect the communication module (CM) to at least one bus device (BD1); wherein the communication module (CM) is configured for a bi-directional communication with the at least one bus device (BD1) and the IoT-network (N);

the communication module (CM) is connected to at least one IoT-network device (I) connected to the IoT-network (N), and the communication module (CM) is configured to receive IoT-request data from the at least one IoT-network device (I) on the IoT-network (N), to store IoT-request data information, and to send an IoT-request to the at least one bus device (BD1);

the at least one bus device (BD1) is configured to receive the IoT-request and to send an IoT-answer to the communication module (CM); and the communication module (CM) is configured to receive the IoT-answer from the at least one bus device (BD1) and to send IoT-answer data on the at least one IoT-network device (I) on the IoT-network (N) using the stored IoT-request data information; and further wherein the IoT-request data information is an address of the at least one IoT-network device;

the building technology communication system comprises a building technology management system (BTMS) connected to the IoT-network (N);

the building technology management system (BTMS) is configured to store functionality information representing functionalities provided by the at least one building technology device (BTD);

the at least one bus device (BD1) is configured to send the functionality information about at least one functionality of the at least one bus device (BD1) to the communication module (CM);

the communication module (CM) is configured to send the functionality information about at least one functionality of the at least one bus device (BD1) to the building technology management system (BTMS);

the building technology management system (BTMS) is configured to receive a functionality request from the at least one IoT-network device (I) and/or is configured to send the stored functionality information to the IoT-network device (I);

the building technology management system (BTMS) is configured to forward the functionality request to the at least one building technology device (BTD) providing the functionality according to the stored functionality information;

the building technology management system (BTMS) is configured to forward communication between the at least one IoT-network (N) device and the at least one building technology device (BTD) providing the functionality;

the building technology management system (BTMS) is configured to send stored functionality information to the at least one IoT-network device (I) indicating at least the at least one building technology device (BTD) providing the functionality; and the IoT-network device (I) is configured to engage in communication with the at least one building technology device (BTD) based on the functionality information received by the at least one IoT-network device (I).

17. A building technology device (BTD) comprising:

a communication module (CM) configured to connect to an IoT-network (N) and to connect to a communication bus (2), and configured for bi-directional communication on the IoT-network (N) and on the communication bus (2), wherein the communication module is further configured to convert communication data between the communication bus (2) and the IoT-network (N); wherein the communication bus (2) is connected to the communication module (CM), and configured to detachably connect the communication module (CM) to at least one bus device (BD1), the communication module (CM) is configured for bi-directional communication with the at least one bus device (BD1) and the IoT-network (N); and the building technology management system is configured to store functionality information representing functionalities provided by the at least one bus device (BD1) of the building technology device (BTD); and further A building the building technology management system (BTMS) is configured to receive functionality information of at least one building technology device (BTD) including information about at least one functionality of the at least one bus device (BD1) of the building technology device, wherein the building technology management system (BTMS) is configured to send stored functionality information at least one IoT-network device (I), and wherein the building technology management system (BTMS) is configured to receive a functionality request from the at least one IoT-network device (I);

the building technology management system (BTMS) is configured to forward the functionality request to the at least one building technology device (BTD) providing the functionality according to the stored functionality information, wherein the building technology management system (BTMS) is configured to forward communication between the at least one IoT-network device (I) and the at least one building technology device (BTD) providing the functionality;

the building technology management system (BTMS) is configured to send stored functionality information to the at least one IoT-network device (I) indicating at least the at least one building technology device (BTD) providing the functionality; the IoT-network device (I) is configured to engage in communication with the at least one building technology device (BTD) based on the functionality information received by the at least one IoT-network device (I), and wherein the building technology management system (BTMS) is configured to store a list of IoT-network devices allowed to communicate with the at least one building technology device (BTD), during a commissioning phase of the building technology communication system.

* * * * *